United States Patent [19]
Dorfi et al.

[11] Patent Number: 5,093,570
[45] Date of Patent: Mar. 3, 1992

[54] DISCRIMINATING ELECTRET RADIOACTIVITY DETECTOR SYSTEM AND METHOD FOR MEASURING RADON CONCENTRATION

[75] Inventors: Kurt Dorfi, North Salem, N.Y.;
James E. West, Plainfield, N.J.;
Gerhard M. Sessler, Darmstadt, Fed. Rep. of Germany

[73] Assignee: Radon Testing Corporation of America, Irvington, N.Y.

[21] Appl. No.: 483,514

[22] Filed: Feb. 22, 1990

[51] Int. Cl.⁵ .............................................. G01T 1/14
[52] U.S. Cl. ..................................... 250/253; 250/255
[58] Field of Search ...................... 250/253, 255, 336.1

[56] References Cited

U.S. PATENT DOCUMENTS

| | | | |
|---|---|---|---|
| 2,695,363 | 11/1954 | Martin | 250/253 |
| 3,665,194 | 5/1972 | Alter et al. | 250/83 |
| 4,064,436 | 12/1977 | Ward, III | 250/253 |
| 4,385,236 | 5/1983 | Hassib et al. | 250/472.1 |
| 4,451,736 | 5/1984 | Cameron | 250/336.1 |
| 4,518,860 | 5/1985 | Alter et al. | 250/253 |
| 4,800,272 | 1/1989 | Harley et al. | 250/253 |
| 4,814,608 | 3/1989 | Dempsey et al. | 250/253 |
| 4,853,536 | 8/1989 | Dempsey et al. | 250/253 |

OTHER PUBLICATIONS

Kotrappa et al., "An Electret Passive Environmental Rn Monitor Based on Ionization Measurement", Health Physics, vol. 54, No. 1 (Jan. 1988), pp. 47-56.
G. Pretzsch, B. Dorschel, H. Seifert, T. Streil & D. Seeliger—Measurement of Tritium Activity Concentration in Air by Means of the Electret Ionisation Chamber—vol. 12, No. 4, pp. 345-349 (1986).

Primary Examiner—Janice A. Howell
Assistant Examiner—Richard Hanig
Attorney, Agent, or Firm—Darby & Darby

[57] ABSTRACT

The detector system includes three substantially similar detectors each of which includes an ionization chamber having a pedestal therein mounting a charged electret. Two chambers are completely sealed except for an equalization aperture. The third detector has filtered inlet openings, which permit entry of radon gas, and responds to gamma rays and radon gas. Each detector is a canister including a lid having a round base surrounded by a cylindrical wall. The canister body is a circular base surrounded by a cylindrical wall that nests within the lid with a telescopic fit. A cylindrical pedestal assembly rests on the lid base and concentrically sandwiches the canister body between the pedestal assembly and lid. A press-fit holds these three elements together. The charged electret is mounted on the platform by a retaining collar that holds the electret with a press-fit. By keeping the three units together until the test starts, one of the sealed containers can have the charge on its electret measured at the beginning of the test in order to provide a baseline measurement. At the end of the test, the charges on the other two electrets are measured and provide a gamma ray background measurement at the test site and a combined radon gas/-gamma ray measurement. By calculations, an accurate measure of radon concentration at the test site can be obtained.

36 Claims, 2 Drawing Sheets

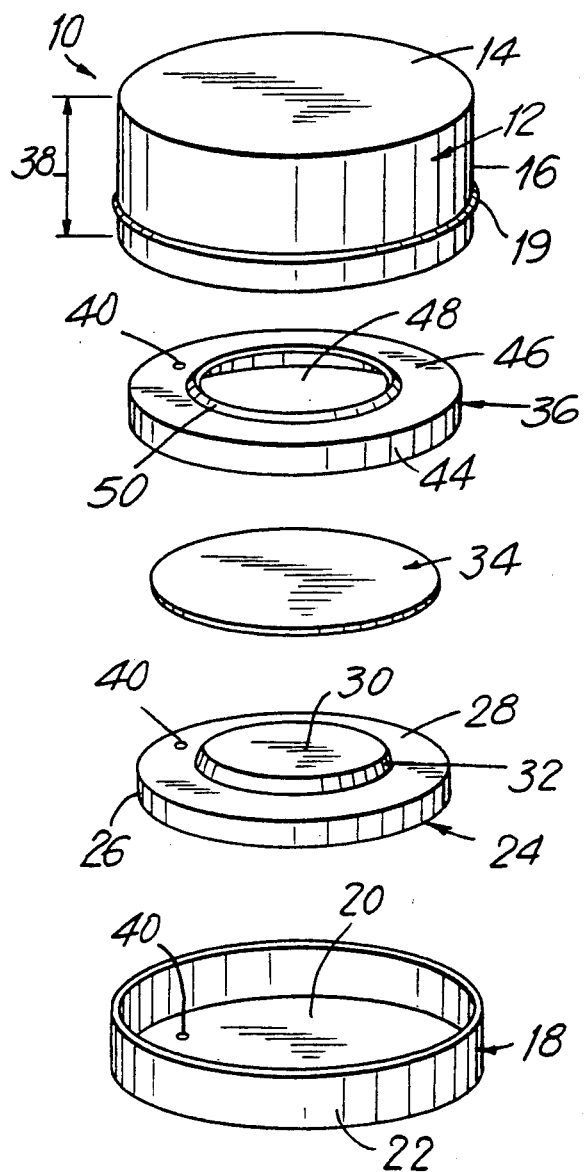
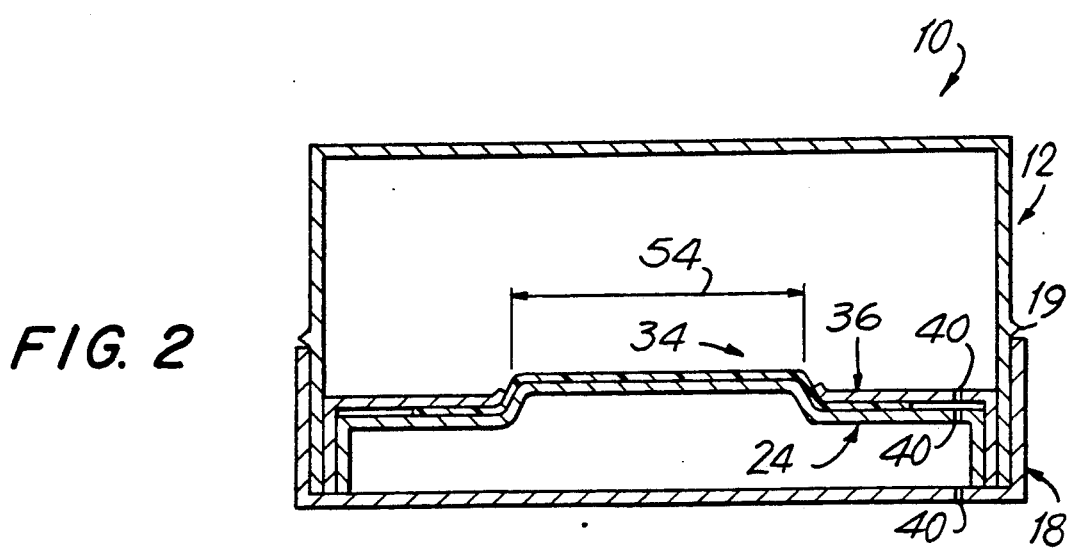
FIG. 1
FIG. 2

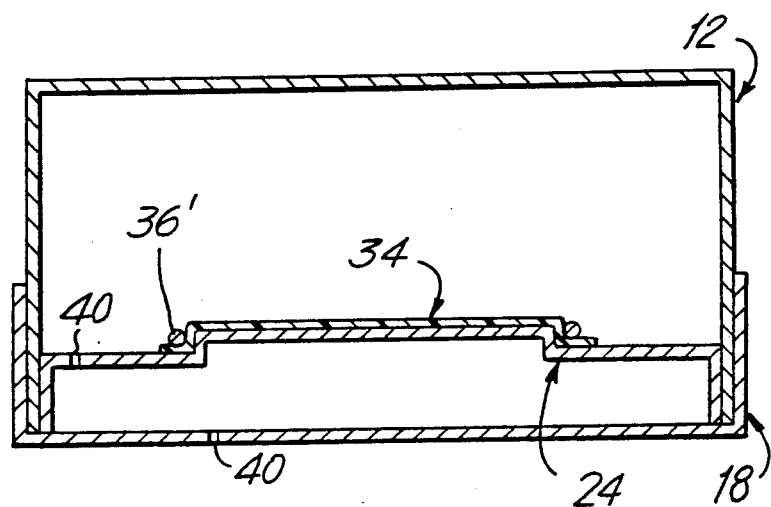
FIG. 3
FIG. 4
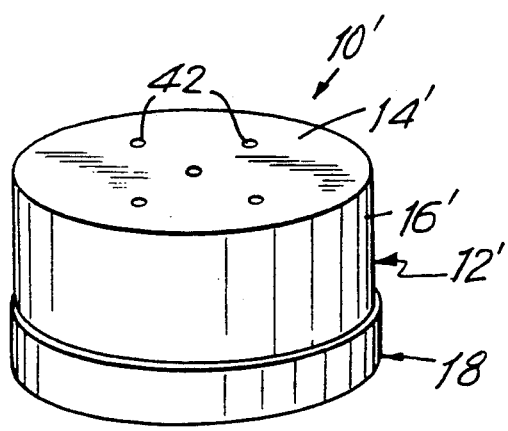
FIG. 5
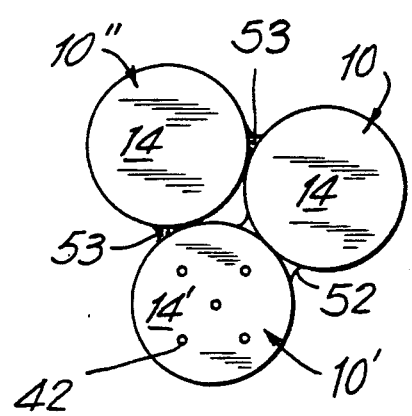
FIG. 6

5,093,570

DISCRIMINATING ELECTRET RADIOACTIVITY DETECTOR SYSTEM AND METHOD FOR MEASURING RADON CONCENTRATION

FIELD OF THE INVENTION

This invention relates generally to a system for detection of radioactive gases in the ambient atmosphere and, more particularly, to a detector system for measuring radon concentrations using electrets as the primary detecting elements.

BACKGROUND OF THE INVENTION

The use of electret ionization chambers for detection of radioactive gases, for example, radon gas, has recently gained general acceptance as an accurate technique for measurement. An electret is a non-conductive material, for example, Teflon TM, that is capable of holding an electrostatic charge of either polarity for a long period of time. The electret attracts charged particles of opposite polarity relative to the surface charge given to the electret. Each charged particle that contacts the electret surface in the ionization chamber neutralizes a portion of the surface charge. By measuring the change in apparent electrical charge on the electret after a known period of exposure, it is possible to compute the concentration of charged particulates and radioactivity in the ambient environment.

Because exposure to radon gas presents a health threat to individuals, detection of radon gas, especially in the home, in schools and in work places, has become a problem warranting attention. Estimates of the number of homes in the United States that should be tested for high concentrations of radon, range in the millions. Testing, to date, represents a considerable expense to many homeowners because the detectors which must be placed in the home for radon detection, and the laboratory equipment for quantifying radon concentrations after measurement has been completed, are expensive per se and tests are usually performed by trained personnel.

Manufacturers are attempting to provide do-it-yourself detectors that the homeowner, for example, can position within his own home for measurement purposes. After exposure, the detectors are sealed and returned to the manufacturer for evaluation of the radon concentration levels that exist at the test site. Results and recommendations are duly reported to the user. However, even with simplified devices, costs can still be prohibitive, for example, in evaluating radon levels in public schools, where several hundred detector units may be required in a single building.

Problems have been inherent in electret detector systems whereby inaccuracies in measurement result from improper handling of the devices both by the manufacturer and the end user. In particular, any contact with the charged surface of the electret, for example, by a person's fingers, or dust particles in the air, neutralizes a portion of charge on the electret surface and creates inaccuracies in measurement. This problem is being overcome in marketed products by providing completely assembled detector units to the user who only has to unseal and seal the unit and record dates during the test period. The detector unit is then returned to the manufacturer for evaluation of radon concentration levels.

However, other factors that are beyond the control of the end user of such commercial products exist which affect the accuracy of the test readings. One major factor is background radioactivity which affects the charge on the electret. For example, accuracy is reduced by the presence of environmental gamma rays in the atmosphere, especially of terrestrial origin such as from the uranium family present in certain rocks including granite. Terrestrial sources of gamma rays vary from region to region due primarily to the geological composition of that area. Gamma rays penetrate the ionization chamber, even when the chamber is sealed against the entry of radon gas and charged particles. The gamma rays penetrating the chamber walls result in a reduction in the charge on the electret. Thus, in evaluating test results when measuring radon, it has been necessary to eliminate the influence of gamma rays on the data, primarily by the use of correction factors based upon theoretical and empirical calculations. Thus, the effect of the presence of gamma rays on the accuracy of the radon measurement is based to some degree upon approximations.

A typical short term electret measurement made by exposure to the atmosphere over a 2 to 7 day period is sufficient in most cases to determine if there is a radon problem. However, it is known that there is a seasonal variation in radon levels. As a result it is desirable to employ long term detectors when marginal levels are detected by short term tests. These long term measurement detectors use electret chambers designed to decay at a slower rate than short term electret chambers. As a result an average radon concentration over several months may be detected.

What is needed is a radioactivity detector system that is economical to produce, is usable by untrained personnel without loss in measurement accuracy, discriminates radon levels from background radiation produced by the presence of gamma rays and can be adapted for both long term and short term measurements.

SUMMARY OF THE INVENTION

It is an object of this invention to provide an improved electret radioactivity detector system and method that measure radon concentrations accurately without distortions in test results introduced by the presence of gamma radiation.

Another object of this invention is to provide an improved electret radioactivity detector system that is easily installed at the test site by untrained personnel without adverse effects on test results.

A further object of this invention is to provide an improved electret radioactivity detector system which is economical to produce.

A still further object of this invention is to provide detectors capable of making short term measurements, e.g. over a few days, and long term measurements, e.g. over several months.

In accordance with a preferred embodiment of the invention, the detector system includes three substantially similar detectors which are produced substantially at the same time, to the same physical standards, in a common environment. Each detector includes an ionization chamber of known internal volume having a pedestal therein with a charged electret mounted for exposure to the interior of the chamber. Two of the chambers are completely sealed except for a small equalization aperture so that no particles or gases from the external ambient may enter and react with the air therein or cause reactions with the charged electret surface. Thus, the presence of radon gas is not detectable with these two detectors. However, gamma rays, which are able to pass through the sealed walls of the detectors and enter the ionization chambers, can react with the air therein to neutralize portions of the charge on the electret surfaces.

The third detector is similar to the other two detectors except its ionization chamber has filtered inlet openings. Except during test measurements, however the filtered openings are sealed. When unsealed these openings permit entry of atmospheric gases which may contain radon gas into the chamber, while excluding dust particles and particles from any source which might influence the electret charge. As with the other two detectors, gamma rays penetrate the ionization chamber walls and cause reactions with the electret charged surface. Thus, during a test period the third detector responds to the presence of gamma rays and radon gas in the ambient atmosphere.

Each detector of the system is a canister which includes a lid having a round planar base surface surrounded by a integral cylindrical surface of low height. The body of the canister is a second circular planar sheet surrounded by an integral cylindrical wall that nests within the cylinder of the lid with a telescopic or threaded fit. A cylindrical pedestal assembly within the canister rests on the circular base of the lid, is concentric therewith, and concentrically sandwiches the body of the canister between the pedestal assembly and the lid. A press-fit or threaded fit holds these three elements together to form the canister. This press-fit or threaded connection allows for ready assembly and disassembly of the canister without need for tapes, adhesives and the like.

The pedestal assembly provides a pedestal with a flat surface or platform facing the open volume of the body interior. The charged electret is mounted on the platform with the charged surface facing the interior of the body, which forms an ionization chamber. By another press-fit or threaded connection a retaining collar holds the electret on the pedestal.

In the one canister capable of detecting radon gas, the filtered openings are provided on the flat circular surface of the canister body. Those openings may be sealed before and after the test period by an adhesive tape to prevent entry of any ambient gases and particles, except for an atmospheric pressure equalization aperture.

Substantially concurrently, the electrets used in the three detectors, are fabricated of the same material, preferably from the same lot of stock material, and are charged, preferably to the same voltage polarity and level. Charging the electret is accomplished by a known method, for example, corona, thermal, liquid. The electrets are then mounted to respective pedestals and the detectors are assembled by nesting each pedestal within a canister lid and then sandwiching, with a press-fit or threaded connection, the canister body between the pedestal and the lid.

A test measurement system is made from the three canisters, two permanently joined together and one temporarily joined as with tape, adhesives and the like. The temporarily joined canister is one of the sealed gamma ray detector canisters that is used, as will be explained, to provide baseline data. The system of three canisters is sold or distributed as a unit.

When a location is to be tested for radon gas, at the beginning of the test, the detachable gamma ray baseline canister is separated from the other two. At this point in time, date and time of test are logged. The sealing cover is removed from the filtered openings provided on the radon detector canister and it and the permanently attached background gamma ray canister are left at the test site for the test period, which may be of extended length. The gamma ray baseline canister is returned to the manufacturer or a measurement facility. At the end of the test period, noted by recording date and time, the filtered openings of the radon detector canister are again sealed and both canisters are returned to the manufacturer or measurement facility.

When the baseline detector is received from the site at the beginning of the test, the voltage on the electret is measured. Because all three detectors have been exposed from the time of their construction to the same environment, this measured voltage is indicative of the exposure to gamma radiation of all the detectors prior to a test measurement and therefore indicate the voltage existing on the other two detectors positioned at the test site at the initiation of the test. At the end of the test, when these two canisters are returned to the manufacturer or measurement facility, the voltage on each electret is measured.

The difference in voltage from the start to the completion of the test period on the electret in the background gamma ray detector, which is entirely sealed during the test period and remains at the test site, indicates the intensity of gamma radiation which has been received during the test period at the test location. The voltage on the electret of the radon detector that has the filtered openings to permit the entry of atmospheric gases which may contain radon gas, represents the effects of both gamma radiation and the concentration of radon gas in the ambient environment at the location where the test was conducted.

Mathematically, it is possible to separate the gamma radiation effects from the radon effects by using the data provided by the detector which measured only gamma radiation for the extended test period. The changes in voltage that occur on the surfaces of the electrets which were used during the extended time period of measurement, are determined by subtracting the surface charge remaining on each electret at the test's conclusion from its initial surface charge based on the voltage on the baseline electret which was sent back for evaluation at the beginning of the test period. Any radiation which influenced the electrets between the time when they are initially charged during fabrication and the time when testing began for a measured time period, is common to the three detectors, since the entire three-detector system is maintained in the same conditions until the actual test begins.

The press-fit or threaded connection in the detectors allow for simple and rapid assembly and disassembly of the units. Mounting the electret on an intermediate and removable pedestal allows for measurements with reduced risk of inadvertent contact with the charged electret surface. Corrections for the presence of gamma radiation are based on actual measurements of such radiation. Thus, accuracy in measuring radon concentration is enhanced.

Other objects and advantages of the invention will be apparent from the following detailed description. The invention accordingly comprises the features of construction, combination of elements and arrangement of parts which will be exemplified in the constructions hereinafter set forth, and the scope of the invention will be indicated only by the appended claims.

BRIEF DESCRIPTION OF THE DRAWINGS

For a fuller understanding of the invention, reference is made to the following detailed description taken in connection with the accompanying drawings, in which:

FIG. 1 is an exploded perspective view of a detector canister for measuring gamma ray effects in accordance with the invention;

FIG. 2 is a sectional view in elevation of the detector of FIG. 1;

FIG. 3 is a alternative embodiment of a retaining collar in accordance with the invention;

FIG. 4 is a section in elevation similar to FIG. 2, of an alternative embodiment of a detector using the retaining collar of FIG. 3;

FIG. 5 is a top perspective view of another detector for measuring radon concentrations in accordance with the invention; and FIG. 6 is an assembly of three detectors in accordance with the invention for use in practicing the method of the invention.

DETAILED DESCRIPTION OF THE PREFERRED EMBODIMENTS

With reference to FIGS. 1 and 2, a gamma ray canister or detector 10 in accordance with the invention is illustrated as including a body 12 which is a right circular cylinder having a planar top surface 14 and an integral cylindrical wall 16. Also included is a lid 18, which is a right circular cylinder, having a circular base 20 and an integral perpendicular cylindrical wall 22. The cylindrical wall 16 of the body 12 can be telescopically received with a press fit within the cylindrical wall 22 of the lid 18. As an alternative, these parts may be connected by screw threads. An annular bead 19 on the wall 16 (not shown in FIG. 2) enhances the interference of the press fit by pushing on the lid wall 22.

A pedestal 24 has a sidewall 26 which is a right circular cylinder. The top edge of the cylinder 26 joins integrally to an intermediate surface 28, and a platform 30 is supported above the intermediate surface 28 by means of a ridge 32. The platform 30 and intermediate surface 28 are substantially parallel planes. The diameter of the pedestal 24 allows for a loose fit with the wall 22 of the lid 18. These dimensions and electret position produce uniform fields throughout the dosimeter area thus improving capture percentage of ionizing particles.

An electret 34 formed of a thin disc of FEP or PTFE polyfluorotetraethylene, i.e. Teflon-, has a metallized bottom surface or is coated with a metal foil and has a diameter greater than that of the platform 30 and less than that of the intermediate surface 28. The electret 34 in an assembled gamma ray detetor 10 rests substantially concentrically on the platform 30 of the pedestal 24 and is held in place by means of a retaining collar 36 having a central opening 48 surrounded by a ridge 50. In assembling the electret 34 to the pedestal 24, the retaining collar 36 is pressed down on the annular perimeter of the electret 34 and slides down in telescopic relationship with the pedestal 24 and is press-fitted between the ridges 32, 50. With slight stretching of the electret, the collar 36 seats against the ridge 32 and intermediate surface 28. Thus, the collar 36 and pedestal 34 sandwich and hold the electret 34 between them to form a pedestal assembly, which is easily handled as a unit in assembly and disassembly of a detector, with the risks of touching the charged electret surface greatly reduced.

Although a circular electret is illustrated (FIG. 1), and described, it should be understood that in alternative embodiments in accordance with the invention, the electret can have another shape, for example, rectangular, square, etc. with the other mechanical elements correspondingly contoured to accommodate the selected electret shape. A circular electret is preferred because there are no sharp angles or projections at a corner that could produce non-uniform fields and tend to discharge the electret.

In fabricating the gamma ray detector or canister 10, a charged electret 34 is assembled to the pedestal 24, or an uncharged electret 34 may be connected to the pedestal 24 by means of the retaining collar 36 and then charged to the desired voltage and polarity. The latter sequence is preferred as it reduces direct handling of the charged electret in assembly. Several methods are available in the art for reliably charging an electret, for example, corona, liquid, thermal methods. The charging technique is not a novel portion of the subject inventions and is not described in detail herein.

Then, the pedestal 24 with the attached electret 34 is seated within the lid 18 and the body 12 is pressed or threaded into the lid 18 such that the body 12 is sandwiched between the vertical wall 44 of the collar 36 and the inner surface of the vertical wall 22 of the lid 18. Friction or screw threads between the adjacent surfaces holds the canister 10 in its assembled condition.

The body 12 and lid 18 are preferably made of an electrically conductive material, including a conductive plastic, or a non-conductive material coated, at least in part, so that a conductive surface is presented within the canister 10. Continuous conductive surfaces are preferred in the canister. The pedestal 24 is also conductive or coated with suitable conductive material. When assembled the pedestal is electrically connected or "grounded" to the body 12 and lid 18.

The purpose of the conductive inside surface of the electret chamber is to form an electrical field between the charged surface of the electret and the conductive surface or the conductive housing. The opposite surface of the electret is electrically connected (grounded) to the conductive inside surface of the chamber because the electret rests upon the pedestal which is connected electrically with the inside chamber surface. Preferably, the uncharged electret surface is metallized, for example, with aluminum foil or a silver alloy. The resulting electrical field between the charged electret surface and the housing drives charged particles in the air within the canister to the electret, more efficiently and more rapidly than if the housing and its inside surface were nonconducting. However, it should be understood that either electret canisters made of conductive/conductively coated material or made of non-conductive material may be used in the subject invention.

The height 38 of the body 12 is determined in accordance with the test period during which the canister will be exposed to ambient radiation. The dimensions of the lid 18 and the electret diameter remain substantially unchanged in detectors for use over a wide range of anticipated test periods. Generally speaking, all other dimensions being held substantially constant, the height 38 of the body 12 is varied inversely with the duration of test measurement. In other words, ionization chamber volume is made smaller as the designed test term is increased. Chamber volume and/or electret thickness may be changed in order to accommodate situations where radon levels and gamma rays are higher or lower than normally encountered.

As shown in FIG. 2, small apertures or openings 40 are formed in each of the base 20 of the lid 18, intermediate surface 28 of the pedestal 24 and retaining surface 46 of the collar 36. These vent holes 40 allow for pressure equalization between the interior of the canister 10 and the ambient environment so as to prevent physical distortions when the units 10 are stored or are in shipment, for example, by air freight. The diameter of the vents 40 are carefully controlled and are small enough e.g. 0.5 mil, so that very few radon derived particles or other ionization atmospheric particles pass through.

FIG. 2 shows a cross-section of the collar retainer 36 illustrated in FIG. FIG. 3 illustrates an alternative embodiment of a retaining collar 36' in accordance with the invention which may be used in place of retaining collar 36. This retaining collar 36'60 is a little more than a hoop. In such an embodiment of the invention, the pedestal diameter is increased to provide for a press-fit of the body 12 between the pedestal wall 26 and the lid wall 22 (FIG. 4).

A second canister or radon detector 10' (FIG. 5) includes all of the elements of the gamma ray detector 10 described hereinabove with the addition to the body 12' in the radon detector 10' of openings 42 in the top surface 14'. Otherwise, the body 12' is the same as the body 12. The openings, of which five are illustrated, allow entrance to the assembled canister 10' of radon gas from the ambient environment when the openings 42 are unsealed. These openings 42 are maintained sealed, for example, with adhesive tape, until an actual measurement is to be initiated. Filters (not shown), for example, of the paper type, are affixed to the inner side of the surface 14' to cover the openings 42 and prevent the unwanted entrance of particles, both charged and uncharged. The filter is of a type well known in the art and accordingly is not discussed in detail herein. The filter presents no substantial obstacle to the entry of radon gas into the interior of the detector 10', and the concentration of radon gas is substantially the same inside and outside the radon detector 10'.

Radon is a radioactive gas that, having entered the radon detector 10', decays spontaneously to form a series of products called "daughters". Some of these products are charged electrically, both positive and negative. The most prominent of these products, of interest here, in connection with the detector 10' are alpha particles that are charged positively and beta particles which are electrons, namely, negative charges. Other charged particles or ions are produced in the detector 10' by the collision of alpha particles with molecules of air. Gamma rays from the ambient environment outside the detector also enter through the detector walls and act upon the air molecules to produce ions.

The electrically charged products are attracted to the electret which is charged to opposite polarity. If the electret surface is charged positively, negative products of radon and gamma radiation are attracted. If the electret surface is charged negatively, positive products are attracted. When a charged product reaches the electret, the charged product neutralizes a portion of the charge on the electret locally, thereby lowering the overall surface charge, thus the measured voltage of the electret. By reading the change in the voltage on the electret, for example, by means of a voltmeter or an electrometer, the number of charged particles which have impinged upon the electret may be calculated. This calculated result gives an accurate measure of the amount of radon gas at the test site, i.e. the concentration of radon gas in the ionization chamber is measured as it relates to the concentration of radon gas in the environment of the test site.

In a gamma ray detector 10, where radon gas is excluded by the absence of openings 42, only the effects of external gamma radiation penetrating the walls of the ionization chamber of the detector 10 affect the voltage on the electret 34 therein. Thus, the voltmeter or electrometer measurements of voltage are only indicative of the intensity of gamma radiation in the ambient environment.

For accuracy in measuring relative levels of radon concentration in the ambient environment, especially over extended time periods, a pair of gamma ray detectors 10, 10" are grouped in a detector system with a single radon detector 10' for their entire assembled history. That is, electrets 34 within the detectors are made as similar to each other as is possible. This is accomplished by applying to each electret the same polarity and voltage level, as concurrently as possible. Preferably, the plastic sheet for each electret 34 is from the same Teflon TM stock material.

Teflon TM, when given a charge has the ability to maintain this charge over long time periods. However, for the same voltage level, thin electrets store more charge than thick electrets. Accordingly, the electret thickness which is selected, generally varies inversely to the anticipated test duration. Thicknesses in the range of 1 mil to 120 mil have given satisfactory results. Long term electret detectors thus have thin electrets and short term detectors have thick electrets.

The three electrets are punched or die-cut from a single sheet and kept together until use begins at a test site. This may be accomplished by physically connecting the two gamma ray detectors 10, 10" with one single radon detector 10' (FIG. 6). A permanent connection by mechanical means 52 (e.g. by solder, bands, etc.) is established between the radon detector 10' and the background gamma ray detector 10. The other or baseline gamma ray detector 10" is detachably connected to the first two detectors, for example, with adhesive 53. At the beginning of an actual test, the detachable gamma ray detector 10" is separated from the other detectors as discussed more fully hereinafter.

In a preferred embodiment of detectors 10, 10', 10" in accordance with the invention, the bodies 12, 12', lid 18, pedestal 24, collars 36, 36", are fabricated of an electrically conductive material, or if non-conductive, a conductive coating is applied to the surfaces within the detector.

In a long term detector intended for a test measurement over an extended time period, for example, more than one month, the diameter of the body is in a range of 4 to 8 cm, and an electret thickness of 1 mil to 5 mil is used. The internal distance between the electret and the inner surface of the top 14 is in a range of 0 0.1 to 2 cm. The electret diameter 54 exposed on the pedestal platform 30 (FIG. 2) is in the range of 2 to 6 cm and the lid height is in the range of 0.2 to 1 cm. Five openings 42 each have a diameter of approximately 2 mm. Elevation of the electret charged upper surface above the base 20 in the lid 18 is less than the height of the side wall 22 of the lid 18, but otherwise is the highest surface in the lid/pedestal assembly structure. This tends to protect the electret field from partial grounding and aids in charging the electret.

In a short term detector intended for a test measurement over a brief time period, for example, less than one month, the internal distance between the electret and the inner surface of the top 14 is in the range of 1 to 4 cm and the electret thickness is 30 to 120 mil. This increase in distance increases the active volume in the detector and the consequent production of charged particles that reduce the electrical charge of the electret.

When measurement is to be made of radon concentration, the three detectors, two gamma ray detectors 10, 10" and one radon detector 10', are maintained in close proximity to each other, and are transported to the test site. At that time one of the gamma ray detectors having no openings 42 by which radon gas may enter, i.e. the gamma ray detector 10", is separated from the other two detectors 10, 10' and is promptly brought or sent to a facility having means to measure the voltage on the electret surface therein. The electret voltage is measured to provide baseline data.

The tape covering the openings 42 of the radon detector 10' is removed at the test site at the start of the test period, i.e., at the time when the baseline detector 10" is separated from the group of three detectors and sent for voltage measurement. The starting time of the test is also recorded.

The two detectors that remain at the test site are kept in close proximity to one another by the mechanical connector for the extended period of the test. At the end of the test term the completion time is properly recorded, the openings 42 in the detector 10' are again sealed (for example, with adhesive tape) to prevent entrance of additional particles and radon gas. The radon detector 10' and the background gamma ray detector 10 are then delivered to a facility where the voltages remaining on each electret 34 are measured individually.

The difference in the voltage on the electret which was in the baseline detector 10" at the beginning of the test and the voltage of the electret in the background detector 10 at the end of the test is indicative of the gamma radiation in the ambient environment of the test site.

The difference in voltage on the charged electrets 34 in the baseline detector 10" and radon detector 10' at the end of the test reflects the relative effects of both gamma radiation and the concentration of radon gas in the ambient environment. As stated above, the openings 42 are sufficiently large such that the radon concentration in the detector 10' is substantially equal to the radiation concentration in the ambient environment of the test site. Thus, the background gamma radiation measurement can be used to correct the radon detector measurement to give a measurement based primarily on radon gas concentration.

The voltage measured on the baseline detector 10" that was returned from the test site at the initiation of the test period, indicates changes in electret voltage that occurred for whatever reasons, including gamma radiation, from the time the voltage was measured during fabrication of the detectors to the time when the actual test usage began. Thus, periods of storage on the shelf and in shipment are included when accounting for changes in voltage on the non-test, baseline detector 10". The voltage on the baseline detector 10", which is initially returned from the test site, is indicative of the start-of-test voltage on the electrets 34 which are positioned at the test site for the test duration. Thus, in calculating the voltage change on the electrets which remain at the test site, a more reliable result may be obtained when the voltage difference is calculated in view of the voltage read on the baseline electret.

The radon gas concentrations and the gamma ray concentrations are not necessarily linearly related to the voltage differences. Thus, it is not acceptable to rely on simple subtractions for the voltage differences on the electrets. Rather graphs of calibration values must be used for accurate calculations of gamma and combined radon and background gamma radiation. Correcting the combined levels with the background gamma figure should also be done by a calibration chart. Naturally, if the voltage measurement device is sophisticated, the correlations may be programmed into the measurement device so that corrected measurement can be read.

Knowing the voltage differences of the detectors 10, 10', the calibration chart will determine the radon (and gamma ray) concentration in the ambient environment at the test site averaged over the test period. Because the level of gamma radiation has the same effect on the electrets 34 in detectors 10, 10', it is possible to separate the effects of radon gas from the gamma radiation effects in detector 10' by using the relative value of concentration of gamma radiation determined from the detector 10 used at the test site over the full test period.

If the nonlinear relationships, i.e., the calibration curve, between changes in electret voltage and radon gas concentration or gamma radiation are unknown, these can be determined empirically by exposing the devices to known concentrations of gamma radiation and radon gas.

It should be understood that in alternative embodiments in accordance with the invention, the body 12 may have the planar surface 14 replaced with a surface of another configuration, for example, dome shaped. Also, other fastening means, for example, screws, crimping, adhesives, etc. may be utilized in the detectors where a press-fit or threaded connection has been described above.

In an alternative construction and method in accordance with the invention, only two canisters, 10, 10', as described above, are used for measuring the radon concentration, if any, in the environment. The canister 10 which is entirely sealed, except perhaps for a pressure equalization aperture, and the canister 10' with filtered inlet openings 42' are manufactured substantially concurrently preferably using materials from the same batch of raw stock. The electrets are charged to the same polarity and voltage level.

In practicing the method in accordance with the invention using two canisters, 10, 10', both canisters are moved simultaneously to the test site where, at the initiation of the test, the sealing cover over the openings 42 of the canister 10' are removed. At the end of the test period, the openings 42 in the canister 10' are resealed and both canisters are then returned together to the manufacturer or to a test facility for evaluation.

The changes which are measured in the respective electret charges are indicative of the effects of gamma radiation on the canister 10, which is always sealed, from the date when it was electrically charged during manufacture. The change in charge on the electret of the canister 10', having openings 42 that are unsealed at the beginning of the test period and sealed at the termination of the test period, is indicative of gamma radiation effects from the time of manufacture in addition to the effects of radon gas in the ambient environment during that period that the openings 42 of the canister 10' were exposed to the ambient environment. The difference in the voltage changes between the electrets in the canisters 10 and 10' is indicative of the radon concentration in the test site environment during the test period, when the openings 42 are uncovered. As indicated above, calibration means may be required to convert these voltage differences into levels of radon concentration and gamma ray intensities.

The three canisters provide more control, more possibilities of comparison. The changes of electret charge level can be detected with greater certainty by using the three canister method. This can occur because changes in the electret charge level are produced not only at the test site during the test period but during the entire history of the canister 10 after it is manufactured and given its electrical charge. This effect may be offset somewhat by storing the canisters in facilities that are substantially shielded against gamma radiation. However, in most cases the loss of accuracy in gamma ray measurement will not be sufficient to justify the expense of such a special facility.

It should also be understood that in an alternative embodiment of the invention, canisters may be aggregated in sets or arrays other than two and three. For example, nine canisters may be used in a set. Such a set would include five sealed canisters 10 and four canisters 10' having openings 42. Manufacturing of the set is undertaken under conditions as described above such that the entire set is produced substantially concurrently, from the same raw stock, charged to the same polarity and voltage, and stored and transported under conditions which are as nearly identical as possible. Preferably, the nine canisters are physically connected, as described above, with one sealed canister 10 being releasably connected to the other canisters.

For a test, the nine canisters are moved simultaneously to the test site. At the beginning of the test, the releasably attached canister 10 is separated from the remaining eight canisters 10, 10' and is returned to the manufacturer or to a test facility for evaluation of the charge on the electret so as to provide baseline data. At the start of the test period, the openings 42 on the four canisters 10' are exposed to the ambient environment, whereas the remaining four canisters 10 remain sealed. After a test period (which is recorded), one canister 10' is sealed and is returned to the manufacturer or to a test facility along with a canister 10 for evaluation of the electret charge.

After another elapsed time period, which is recorded, a second canister 10' is sealed and returned along with a canister 10 for evaluation of the electret charge. After yet another measured time period, the last canister 10' is sealed and returned with the last canister 10 to a facility for evaluation of the charge. In this way, using evaluation techniques as described above, a history of relative gamma ray and radon gas concentrations may be gathered over an extended period of time with intermediate values determined between the start and end of the full test period. For example, a one year test can be made using the nine canister array, with a pair of canisters being returned for evaluation at three month intervals following initiation of the test when the first sealed canister is returned for evaluation of electret voltage.

Although the methods described above relate to measurements in the ambient air, it should be understood that the detectors and methods may also be applied to measurements in closed containers, soil samples, in water, etc.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which might.,be said to fall therebetween.

What is claimed is:

1. A method for determining radon gas concentrations using electret detectors, comprising the steps of:
   (a) fabricating three electret elements of substantially identical characteristics;
   (b) charging said electret elements with the same polarity and surface charge level;
   (c) assembling said three charged electret elements respectively into first, second and third ionization chambers of the same contour and internal volume, said chambers with their electret comprising first, second and third electret detectors, respectively, a sealed inlet opening to the first chamber being provided for said first detector, said inlet opening when unsealed allowing passage therethrough of at least radon gas from the ambient environment, said second and third detectors being sealed against entry of ambient gases and particles;
   (d) unsealing the inlet openings of the first detector and measuring the surface charge on the electret of said third detector at the beginning of radon concentration determination;
   (e) measuring the surface charge on the electret of said first and second detectors at the end of a radon concentration determination; and
   (f) determining the radon gas concentration based on the measured surface charges.

2. A method for detection as claimed in claim 1, and further comprising the steps of:
   (g) providing said three detectors at a site for intended measurement of ambient conditions; and
   (h) positioning said first and second detectors in close proximity one to the other at said measurement site.

3. A method for detection as claimed in claim 2, and further comprising the step of:
   allowing said first and second detectors to remain at said measurement site for a measured time period.

4. A method for detection as claimed in claim 3, wherein the step of determining gas concentration comprises the steps of:
   calculating the difference between said measured third detector electret surface charge and said second detector electret surface charge after said time period to obtain gamma ray background measurement;
   calculating the difference between said measured third detector electret surface charge and said first detector electret surface charge after said time period to obtain a combined radon gas and gamma ray background measurement; and adjusting the combined radon gas and gamma ray background measurement and the gamma ray background measurement to detect the radon gas concentration.

5. A method for detection as claimed in claim 4, and further comprising the steps:
determining mathematically the relative levels of gamma radiation acting on said electret of said second detector based on the surface charge difference between said third and second detectors;.
determining mathematically the relative level of radon radiation and gamma radiation acting on said electret of said first detector based on the surface charge difference between the third and first detectors;
eliminating mathematically the effects of gamma radiation from the level of radon and gamma.

6. A method as claimed in claim 1, wherein said opening in said first detector is filtered to exclude entry to said chamber of particles, changes in the electret surface charge of said first detector during said test resulting substantially from ambient radon gas and gamma radiation.

7. A method as claimed in claim 1, wherein said electrets are fabricated from the same batch of stock material.

8. The method as claimed in claim 1, wherein said electrets are fabricated of one of FEP and PTFE.

9. The method of claim 1 and further comprising a step following step (c) as follows:
maintaining said first, second and third detectors in close proximity one to the other prior to use in measurements.

10. A method for detection of radon gas concentrations using electret detectors, comprising the steps of:
(a) providing first, second and third detectors at a site for intended measurement of ambient conditions, each said detector containing an electret having an initial surface charge, said first detector being provided with a sealed inlet opening, said inlet opening being of a sufficient size to allow generally unimpeded passage therethrough of at least radon gas from the ambient environment when the seal is removed, said second and third detectors being sealed against entry of ambient gases and particles;
(b) positioning said first and second detectors in close proximity one to the other at said measurement site;
(c) unsealing said inlet opening on said first detector;
(d) measuring the surface charge on the electret of said third detector at the beginning of a measured time;
(e) allowing said first and second detectors to remain at said measurement site for the measured time period;
(f) at completion of said measured time period, measuring the surface charge respectively on the electrets of said first and second detectors.

11. A method for detection as claimed in claim 10, and further comprising the steps of:
(g) calculating the difference between the surface charge on said third detector electret and the surface charge measured at the end of said test period on said first detector electret to obtain a combined radon-gamma level; and
(h) calculating the difference between the surface charge on said third detector electret and the surface charge on said second detector electret after said test period to obtain a gamma level.

12. A method for detection as claimed in claim 11, and further comprising the steps of:
determining mathematically the relative level of gamma radiation acting on said second detector electret based on the surface charge difference calculated for said second detector;
(j) determining mathematically the relative level of radon and gamma radiation acting on said first detector electret based on the surface charge difference calculated for said first detector;
(k) eliminating mathematically the effects of gamma radiation from the level of radiation determined for the first detector.

13. A method for detection of radon gas concentrations using electret detectors comprising the steps of:
(a) providing first, second and third detectors at a site for intended measurement of ambient conditions, each said detector containing an electret with a known surface charge, said first detector being provided with a sealed inlet opening, said inlet opening being of a sufficient size to allow generally unimpeded passage therethrough of at least radon gas from the ambient environment when unsealed, said second and third detectors being sealed against entry of ambient gases and particles;
(b) positioning said first and second detectors in close proximity one to the other at said measurement site;
(c) unsealing said inlet opening on said first detector;
(d) measuring the surface charge on the electret of said third detector;
(e) allowing said first and second detectors to remain at said measurement site for a measured time period;
(f) sealing said inlet opening on said first detector; and
(g) transmitting said first and second detectors to a facility for evaluation.

14. A method for measurement of radon gas concentrations at a test site using electret detectors comprising the steps of:
(a) measuring the surface charge on a third electret detector, said third detector being delivered from said test site at the initiation of said test, said third detector being sealed against entry of ambient gases and particles;
(b) measuring the surface charge on the electret of a second detector sent from said test site at the completion of said test after a measured test time, said second detector being sealed against entry of ambient gases and particles;
(c) measuring the surface charge on the electret of a first detector sent from said test site at the completion of said test, said first detector having an inlet opening for allowing generally unimpeded passage therethrough of at least radon gas from the ambient surroundings, said inlet opening being unsealed for only the test period from the initiation of said test to the completion of said test at said site;
(d) calculating the difference in voltage between said third detector measurement and said second detector surface charge measurement;
(e) calculating the difference between said third detector surface charge measurement and said first detector surface charge measurement;
(f) determining mathematically the relative levels of gamma radiation acting on said electret of said second detector based on the voltage difference between said third and second detector voltage;

(g) determining mathematically the relative level of radon and gamma radiation acting on said electret of said first detector based on the voltage difference between said third and first detector voltage; and (h) eliminating mathematically the effects of gamma radiation from the level of radiation determined by the difference between said third and first detector voltage to determine the radon concentration, said gamma radiation being indicated by the difference in voltage on said electrets of said second and third detectors at the end of said test.

15. A system for determining radon gas concentration at a test site, comprising:

first, second and third electret detectors, each said detector containing an electret, said first detector having an inlet opening allowing generally unimpeded passage therethrough of at least radon gas from the ambient environment and being responsive to the presence of radon gas and gamma radiation, said second and third detectors being sealed against entry of ambient gases and particles and being responsive to the presence of gamma radiation.

16. A system as claimed in claim 15, wherein said first and second detectors are fixedly joined together, and said third detector is releasably joined to at least one of said first and second detectors.

17. A system as claimed in claim 15, and further comprising means for reversibly sealing said inlet opening.

18. A detector for measuring concentrations of radon gas and gamma radiation at a test site, comprising:

a hollow lid having a base and a side wall surrounding said base;

a hollow body having a base and a side wall surrounding said base, said body side wall releasably engaging said lid side wall with a telescopic fit and forming an enclosed space between said lid and said body;

a pedestal positioned within said lid, said pedestal having a support surface facing said body;

an electret with a chargeable surface said electret being mounted on said pedestal support surface with said chargeable surface facing said body; and means for mounting said electret to said pedestal.

19. A detector as claimed in claim 18, wherein said electret is spaced from said lid base by a distance less than the height of said lid wall.

20. A detector as claimed in claim 18, wherein the interior surfaces of said closed space are at least in part electrically conductive.

21. A detector as claimed in claim 18, and further comprising an inlet opening in said body.

22. A detector as claimed in claim 21, wherein said inlet opening is covered by a filter, said filtered opening excluding particles from entering said enclosed space and allowing passage therethrough of radon gas.

23. A detector as claimed in claim 19, wherein said lid base is circular and said lid wall is cylindrical, said body base is circular and said body wall is cylindrical.

24. A detector as claimed in claim 23, wherein said pedestal and said pedestal support surface are circular, said pedestal further having an intermediate surface spaced from said support surface, and means connecting said support and intermediate surfaces, and means for spacing said intermediate and support surfaces from said lid base.

25. A detector as claimed in claim 18, wherein said means for mounting said electret to said pedestal includes a collar having a central opening, said collar engaging said pedestal so as to sandwich said electret between said collar and said pedestal, so the charged electret surface is exposed in said central collar opening.

26. A detector as claimed in claim 25, wherein the engagement of said pedestal and said collar is effected by press-fitting them together.

27. A detector as claimed in claim 25, wherein said collar engages said body wall with a press-fit, said body wall is sandwiched between said collar and said lid.

28. A detector as claimed in claim 20, wherein the pedestal support surface is at least in part electrically conductive and electrically connected to said interior conductive surface of said closed space.

29. A detector as claimed in claim 18, wherein the interior surfaces of said closed space are electrically nonconducting.

30. A detector as claimed in claim 18, wherein said body and lid are electrically conductive.

31. A detector as claimed in claim 28, wherein a surface of said electret is uncharged, said uncharged surface contacting a conducting portion of said pedestal support surface.

32. A detector as claimed in claim 18, wherein said pedestal engages said body side wall with a press fit.

33. A method for producing an electret detector system for determining radon gas concentrations, comprising the steps of:

(a) fabricating three electret elements;

(b) charging each said electret element with a known polarity and voltage level;

(c) assembling said three charged electret elements respectively into first, second and third ionization chambers, said chambers with their charged electret comprising first, second and third electret detectors, respectively, a sealed inlet opening to the first chamber being provided for said first detector, said inlet opening when unsealed allowing passage therethrough of at least radon gas from the ambient environment, said second and third detectors being sealed against entry of ambient gases and particles.

34. A method for producing an electret detector system as claimed in claim 33, wherein said electrets are of substantially identical physical and electrical characteristics.

35. A method for producing an electret detector system as claimed in claim 33, wherein said first, second and third ionization chambers have substantially the same contour and internal volume.

36. A method for producing an electret detector system as claimed in claim 33, wherein said three electret elements are each charged with the same polarity to substantially the same voltage level.

* * * * *